Figure 1:
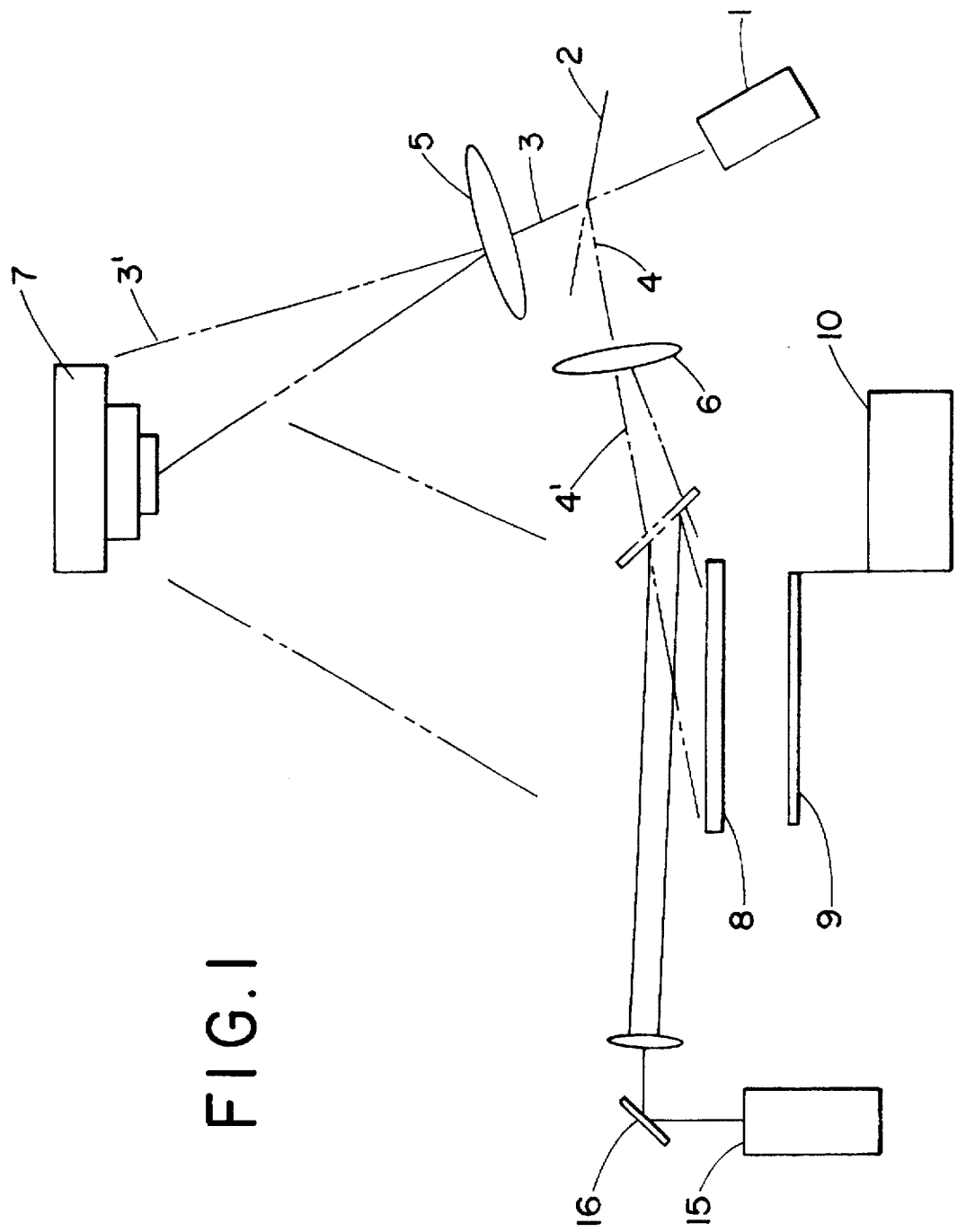

United States Patent [19]

French

[11] Patent Number: 5,796,498
[45] Date of Patent: Aug. 18, 1998

[54] HOLOGRAPHIC IMAGING

[75] Inventor: Paul Michael William French, London, Great Britain

[73] Assignee: Imperial College of Science, Technology and Medicine, London, United Kingdom

[21] Appl. No.: 284,616

[22] PCT Filed: Feb. 15, 1993

[86] PCT No.: PCT/GB93/00316

§ 371 Date: Sep. 6, 1994

§ 102(e) Date: Sep. 6, 1994

[87] PCT Pub. No.: WO93/16419

PCT Pub. Date: Aug. 19, 1993

[30] Foreign Application Priority Data

Feb. 14, 1992 [GB] United Kingdom ............... 9203239

[51] Int. Cl.⁶ ................... G03H 1/04; G03H 1/26
[52] U.S. Cl. ................... 359/4; 359/7; 359/24
[58] Field of Search ................... 359/3, 4, 7, 9, 359/24, 30, 901

[56] References Cited

U.S. PATENT DOCUMENTS

| | | | |
|---|---|---|---|
| 3,531,589 | 9/1970 | Collier et al. | 359/24 |
| 3,542,452 | 11/1970 | Gerritson et al. | |
| 3,560,070 | 2/1971 | Pennington et al. | 359/9 |
| 3,585,847 | 6/1971 | Brenden | 359/901 |
| 3,715,164 | 2/1973 | Heflinger | 359/24 |
| 3,717,415 | 2/1973 | Woerdman | 359/24 |
| 3,790,245 | 2/1974 | Hannan et al. | |
| 3,825,317 | 7/1974 | Inoue et al. | |
| 3,847,465 | 11/1974 | Micheron et al. | 359/24 |
| 4,111,519 | 9/1978 | Gillis et al. | 359/9 |
| 4,155,630 | 5/1979 | Ih | 359/24 |
| 5,005,927 | 4/1991 | Cudney et al. | |
| 5,130,530 | 7/1992 | Liu | 250/216 |
| 5,132,811 | 7/1992 | Iwaki et al. | |
| 5,198,915 | 3/1993 | Watson | 359/30 |
| 5,291,321 | 3/1994 | Noh | 359/30 |
| 5,299,035 | 3/1994 | Leith et al. | 359/30 |

OTHER PUBLICATIONS

Nils H. Abramson et al. "Single pulse light-in-flight recording by holograph".Applied Optics, vol. 28, No. 10, 15 May 1989, pp. 1834–1841.

Primary Examiner—Jon W. Henry
Attorney, Agent, or Firm—Fay, Sharpe, Beall, Fagan, Minnich & McKee

[57] ABSTRACT

A holographic imaging apparatus having a pulsed laser light source for generating an object beam and a reference beam whereby an object, obscured by a diffusing medium, is illuminated by the object beam. A real time interferogram recording medium is exposed to the coincidence of light reflected from the object and the reference beam to record an interferogram. A holographic image is then reconstructed from the interferogram and may be viewed and recorded. The pulsed laser light source generates a beam which is divided by a conventional beam splitter device into an object beam and a reference beam. The object beam is then diverged by a lens which forms a diverging object beam to illuminate the object. The reference beam is diverged through another lens to form a diverging reference beam which is directed so that it illuminates a photoreactive crystal. The coincidence of the reflected light and diverging reference beam generates a pattern of interference fringes known as an interferogram which is recorded by the crystal. The apparatus can use time-gating in the holographic medium to use ballistic and snake-like light, which arrives before scattered light, to construct a holographic image. The apparatus can also obtain depth information for 3-D images by using the time-gating technique to obtain the image bearing light from a 3-D object. The apparatus also may record light-in-flight images of the object, to record different depths of the object separately, by using an optical delay assembly.

34 Claims, 4 Drawing Sheets

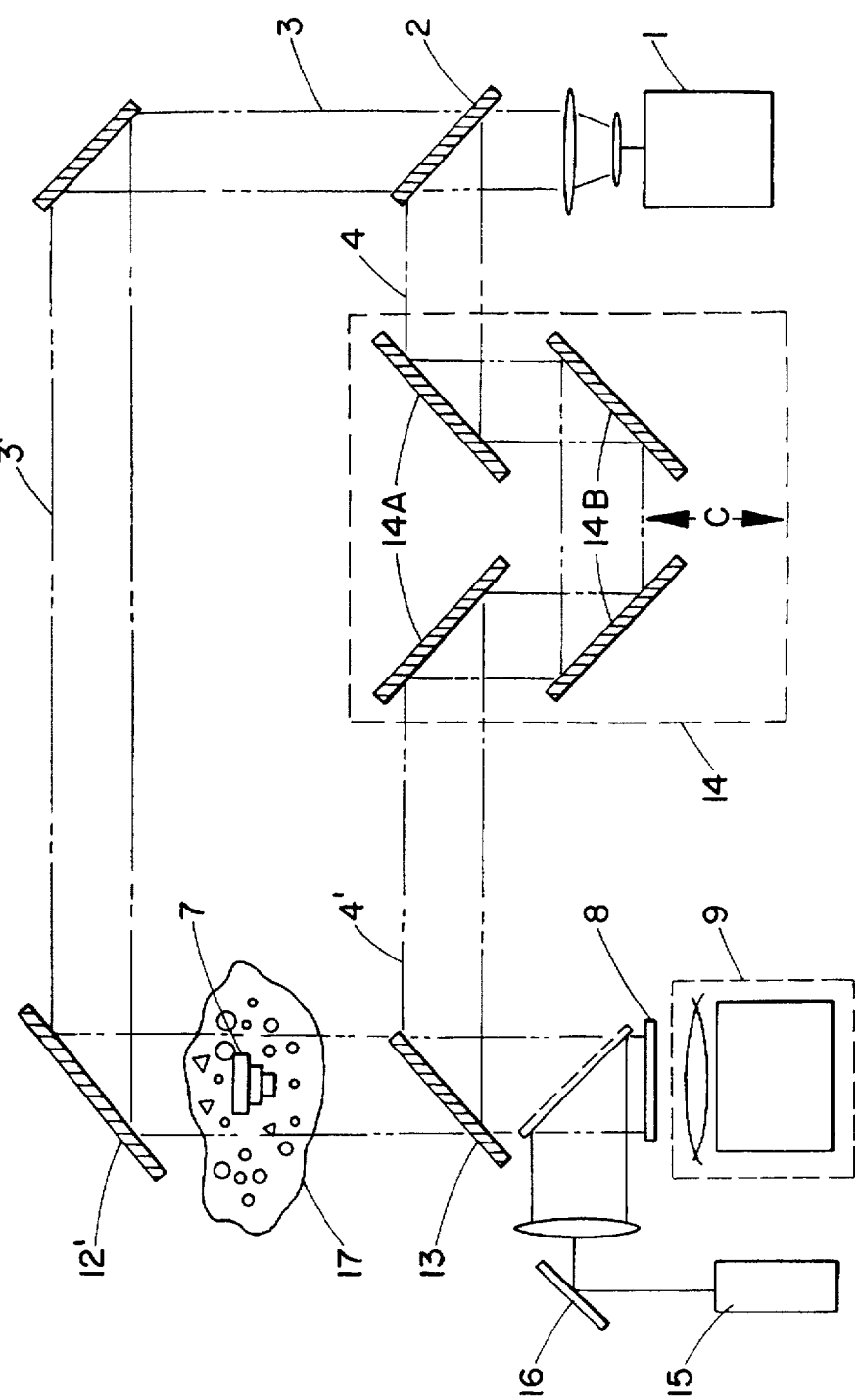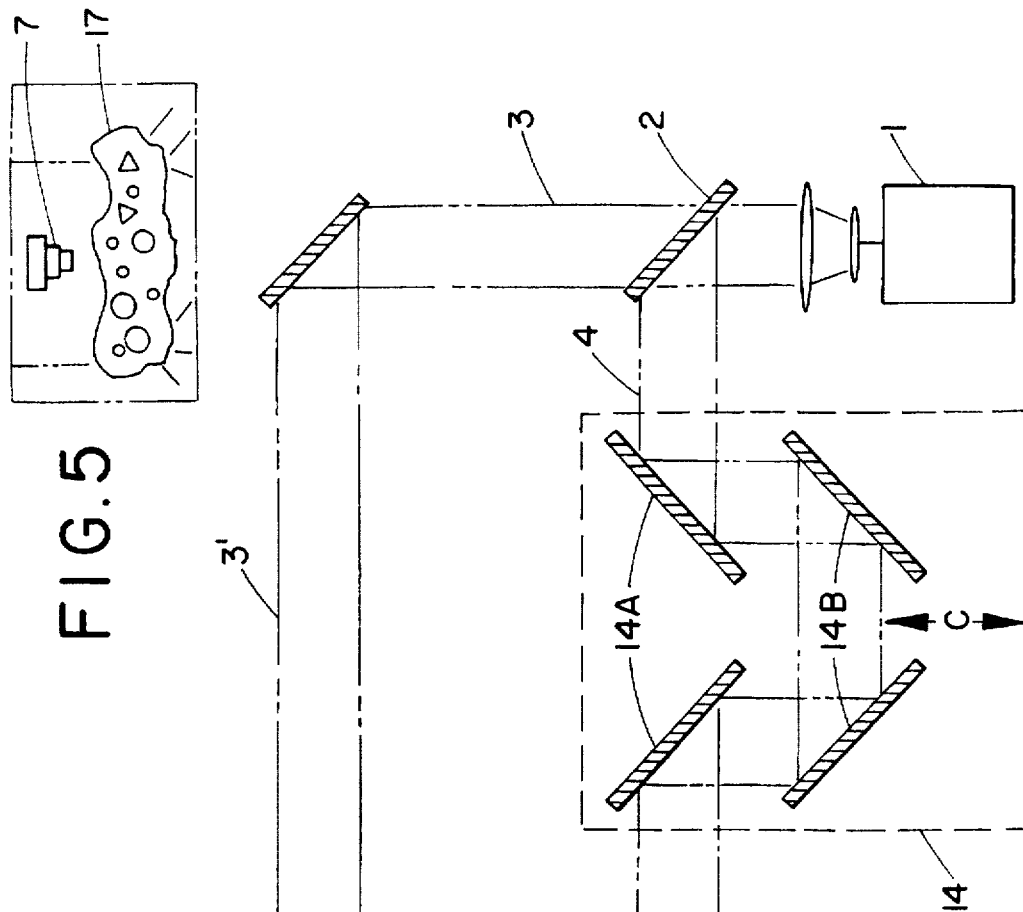

HOLOGRAPHIC IMAGING

The present invention provides apparatus for generating real time or near real time 2-D and/or 3-D images of objects, particularly objects obscured by diffusing media.

The apparatus according to the invention is expected to have applications in medical diagnostic equipment for imaging internal tissues in human, animal or plant bodies in-vivo, in micro-fabrication, microscopy and various engineering applications.

Various techniques for producing 3-D holographic images are well known but a brief explanation is included for the sake of completeness and to assist in the readers understanding of the present invention. Briefly, an object is illuminated by an object beam of coherent light from a laser source. An image recording medium, commonly a photographic plate is exposed to the object light reflected from the object. Simultaneously, a reference beam derived from the source, is directed on to the surface of the photographic plate. By careful arrangement of the apparatus the coincidence of the object beam and the reference beam generates a pattern of interference fringes which record the intensity and phase of the wavefront of the object light. By developing the plate and illuminating the resulting interferogram using a reconstruction beam similar to the reference beam, a virtual or a real image of the object can be created.

The closeness of the fringes in a conventional hologram means that the recording will be very sensitive to movement of the object during exposure, causing severe degradation of the hologram record. When photographic plates are used for recording exposure times of seconds are required for the light levels commonly used.

In a recent experiment conducted by Abramson N. H. and Spears K. G. entitled "Single pulse light-in-flight recording by holography" published in Applied Optics/Vol 28, No.10/ 15:05:89, Abramson and Spears disclose apparatus and a method whereby light-in-flight techniques allow temporal information to be encoded into the hologram as position along the holographic plate. To achieve this a pulsed laser source is used and the reference beam illuminates the holographic plate at oblique incidence so that interference occurs for different relative delays between the object and reference beam. Once the Hologram is recorded the holographic plate can be developed and illuminated with a reconstruction beam (which may be similar to the reference beam although this beam can be a continuous wave and of a different wavelength). For a three dimensional object different views (two dimensional images) of the object at different positions along the holographic plate will correspond to different depths in the object. Thus a contour map can be obtained, giving three dimensional information about the object.

The time needed to record a hologram onto photographic plate seriously limits the usefulness of Abramson and Spears technique. Because of the low light levels, prolonged exposure times of the order of seconds are required. Also, film requires long developing times, of the order of thirty minutes. This is very inconvenient and impractical for many possible applications. The holographic film used is expensive and cannot be reused.

Accordingly there is provided apparatus comprising a light source to generate an object beam and a reference beam whereby an object can be illuminated with the object beam, a real-time recording medium arranged to be exposed to and record an interferogram formed by the coincidence of light reflected from the object and the reference beam, and means for viewing and recording the holographic image which is reconstructed from the interferogram.

The 'real-time' recording medium may be a photorefractive crystals (such as crystals of $Bi_{12}SiO_{20}$) which has the advantageous property of responding to light by locally changing the refractive index from a rest to an excited state. Thus the interferogram pattern to which the photorefractive crystal is exposed is recorded and can be read by illuminating the crystal with a suitable reconstruction beam. Because photorefractive crystals are faster than photographic plates and have resolution similar to photographic plates it is possible to expose the photorefractive crystal for a very brief duration and then, using a suitable reconstruction beam, to read the hologram stored in the crystal and record the holographic image using an electronic camera (for example) between exposures. Preferably the electronic camera is provided by a charge coupled device. The holographic image is conveniently recorded electronically via the CCD and the electronic record data thus produced can be processed to reconstruct an image of the object.

The present apparatus can be used to record light-in-flight images by using a configuration such as that disclosed by Abramson and Spears. By recording multiple exposures and superposing images of otherwise processing the image data, objects obscured by diffuse media may be imaged. This may be achieved even where the object is in motion. Thus the present apparatus has potential applications in medical diagnostic apparatus for recording images of internal tissues.

It will be appreciated that the present apparatus allows the recordal of holograms in milliseconds, and enables the hologram to be viewed practically immediately, in real time. The photorefractive crystal is indefinitely reusable. Conveniently the CCD camera allows a sequence of images obtained at different positions along the recording plane to be recorded. In this way a contour map of the object can quickly be obtained and stored for subsequent (three dimensional) image processing.

When used in conjunction with a frame grabber and computer, the apparatus permits averaging of a stored sequence of images to be routinely and rapidly carried out. This is useful when imaging through time varying diffuse media such as a living body which can randomly distort the wavefronts and produce significant laser speckle. If the hologram is recorded on a time scale fast compared to the relaxation time of the speckle, then averaging of repeated exposures would remove much of the unwanted distortion.

While most applications of the present invention will require the provision of an electronic camera to electronically record the holographic imaging data for subsequent processing, some applications may not require an electronic camera, for example, where the image data is to be processed optically or the image is to be viewed by eye and directly reconstructed from the photorefractive crystal.

To reduce the size of photorefractive crystal it may prove advantageous to scan the field of view of the crystal along the holographic image plane. This may be achieved either by moving the crystal or, eptically, by moving its field of view.

Figure 2:
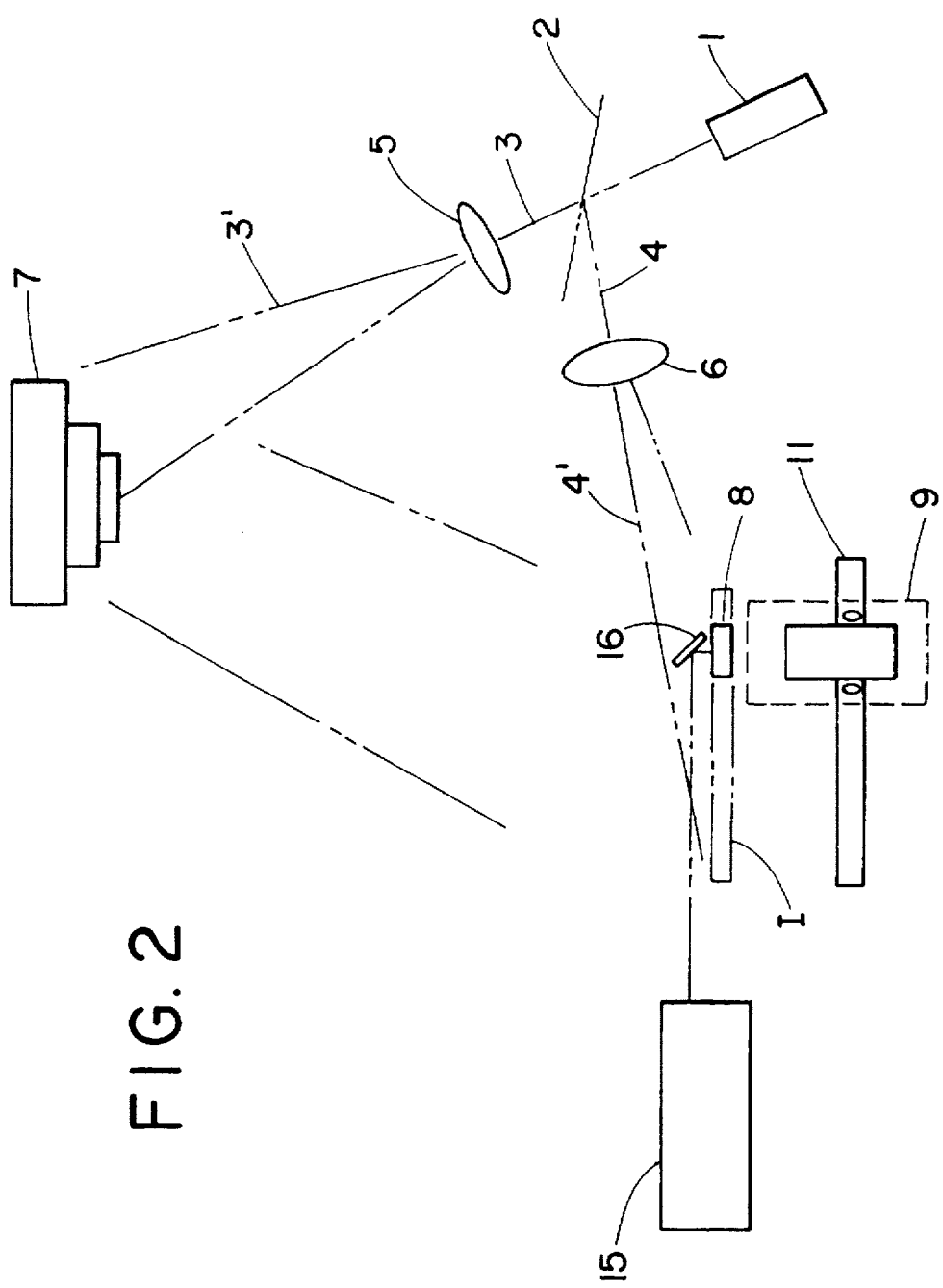
Figure 3:
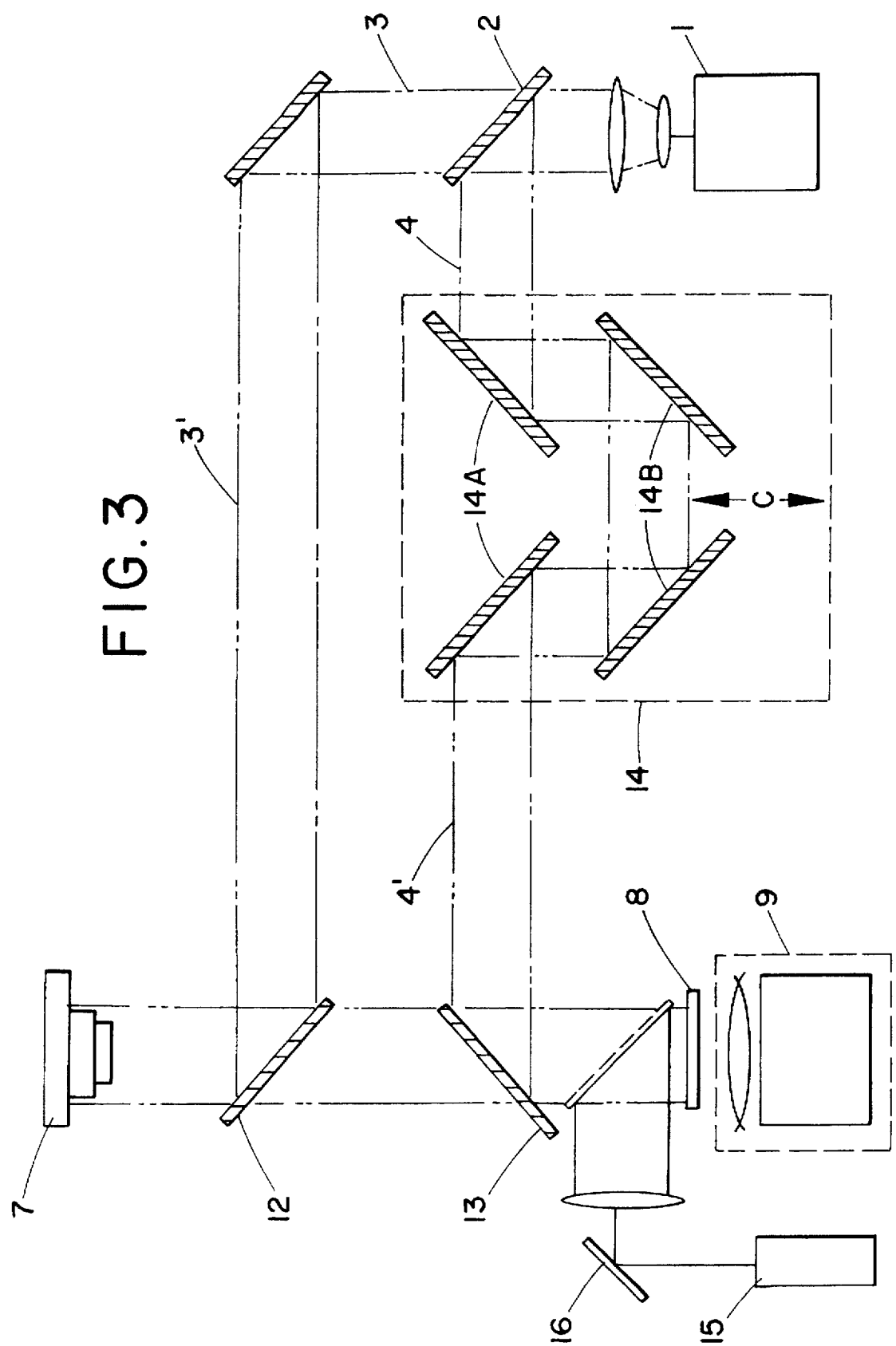

Embodiments of apparatus constructed in accordance with the present invention will now be described, by way of example only, with reference to the accompanying schematic drawings, in which:

FIG. 1 shows a first embodiment,
FIG. 2 shows a second embodiment,
FIG. 3 shows a third embodiment,
FIG. 4 shows a fourth embodiment, and
FIG. 5 shows a fifth embodiment.

The apparatus shown in the drawing includes a pulsed laser light source 1 such as an argon ion laser or $Ti:Al_2O_3$ laser or semi-conductor diode pumped solid state layer or another suitable laser. These sources can be continued in known manner to emit coherent pulsed light at any one of a variety of wavelengths. The source 1 generates a pulsed laser beam which is divided by a conventional beam 4. The object beam 3 is diverged by a lens 5 to form a diverging object beam 3' to illuminate an object 7. Similarly, the reference beam 4 is diverged through a lens 6 to form a diverging reference beam 4' which is directed obliquely to illuminate a photorefractive crystal 8. The photorefractive crystal 8 is arranged to be exposed to light reflected from the object 7 so that the coincidence of the reflected light and diverging reference beam 4' generates a pattern of interference fringes known as an interferogram, which is temporarily recorded by the crystal 8. After the crystal 8 is exposed the holographic image stored as the recorded interferogram is read out to a camera 9 which includes a charge coupled device (CCD) by illuminating the crystal 8. The interferogram is read out using a reconstruction beam generated by a laser source 15 and directed onto the photorefractive crystal via an optical assembly which may include mirrors and lenses 16. The reconstruction beam may illuminate the photorefractive crystal 8 at an angle of incidence different to that of the object beam, e.g., by Bragg-matching a different wavelength reconstruction beam in the photorefractive crystal. The camera then converts the holographic image into electronic signals to be recorded in the memory of an image processing system 10. This can then by processed to generate an image.

In the first embodiment of FIG. 1 the crystal 8 is of sufficient size to view the whole interferogram simultaneously. However, for most practical applications, the crystal 8 cannot be made sufficiently large for this. To overcome this problem the crystal 8 and the camera 9 can be mounted on a carriage 11 which scans the crystal 8 through the plane of the interferogram 'I' as shown in FIG. 2. In this case the single interferogram is recorded as a sequence of image frames in the electronic memory of the data processing system 10. The reconstruction beam moves with the carriage 11 such that it continuously illuminates the photorefractive crystal for the purpose of reconstructing the holographic image.

FIG. 3 illustrates a third embodiment having a colinear configuration. In the colinear apparatus the reference beam 4, 4' and object beam 3, 3' are split off of the source beam via a beam splitter device 2. The object beam 3' is directed onto the object via an object beam splitter 12. The object beam reflected from the object 7 is directed onto the holographic medium (photorefractive crystal) through the object beam splitter 12 a reference beam splitter 13. The beam splitter 13 directs the reference beam 4' onto the photorefractive crystal 8 so that the reference beam falls onto photorefractive crystal 8 colinear to the object beam.

The reference beam 4, 4' is guided through an optical delay assembly 14 which allows the path length of the reference beam 4, 4' to be altered, by moving the guide mirrors 14B in the direction indicated by arrow 'C', towards or away from the mirrors 14A in order to view images of the object having different spatial depth and temporal relationships. Thus, this apparatus avoids the problems of having to scan across a large interferogram generated by a reference beam which impinges obliquely on the object beam and also avoids compromising the spatial resolution of the image. This configuration eliminates the trade-off between spatial and temporal resolution which occurs for the oblique incidence configuration.

The apparatus presents the possibility of recording light-in-flight images of the object such that different depths of the object will be imaged separately, either at different positions on the holographic plate 8, or in different exposures corresponding to different settings of the optical delay assembly 14.

The apparatus shown in FIG. 4 illustrates one potentially important application whereby an object 7 immersed in an obscuring scattering medium 17 can be imaged. In this case the object beam 3' is directed by a mirror 12' to be transmitted through the obscuring medium. An interferogram is then constructed on the photorefractive crystal using the reference beam 4' and the light transmitted through the obscuring medium 17.

FIG. 5 illustrates an alternative application of the apparatus shown in FIG. 4 in which the object is obscured behind the diffusing medium 17.

The depth information of the 3-D image is obtained from the invention described above by a time-of-flight measurement. A series of images is recorded with each image corresponding to a different arrival time at the holographic medium (photorefractive crystal). This apparatus can also be used to image objects embedded in, or located behind, scattering media such as human tissue.

When an coherent image-bearing light signal propagates through a scattering medium, the light is mostly scattered and the coherence of the signal is destroyed. If the image-bearing signal light is scattered in many directions, the image information will be lost.

In many practical situations, a very small fraction of the image bearing light does propagate, without scattering, directly through the scattering medium. This unscattered or least scattered, light can be used to reconstruct the image provided that it can detected. Unfortunately, the ratio of the scattered light to the unscattered light is very large and usually the unscattered light swamps the remaining image-bearing signal light and makes detection and image reconstruction impossible.

The unscattered image-bearing light takes the most direct path through the scattering medium and so arrives at a suitable detector before the scattered light. Using the apparatus described above, it is possible to make a holographic image using the earliest arriving light i.e., the light which has the shortest time-of-flight. In this way an image can be reconstructed from the earliest arriving (and therefore image-bearing unscattered) light. Thus an alternative use of the invention described above is to view objects in real time or in single-shot which are obscured by scattering media. This is illustrated in FIG. 4.

The invention can obtain depth information for 3-D images, in real-time or single shot mode, by time-gating the image bearing light from a 3-D object using holography medium such as a photorefractive crystal. It can also use the time-gating in the holographic medium to discriminate in favor of early arriving image-bearing light, from an object obscured by a scattering medium, against a background of scattered light which might otherwise swamp the signal light and make image reconstruction impossible.

I claim:

1. An apparatus for imaging an object obscured by a diffusing medium, comprising:

a pulsed laser light source to generate an object beam (3') and a reference beam (4') whereby the object (7) obscured by the diffusing medium can be illuminated with the object beam (3');

a real time interferogram recording medium (8), comprising a photorefractive medium, arranged to be exposed to, and to record an interferogram formed by the coincidence of light from the object (7) and the reference beam (4');

a means for reconstructing an image from the interferogram; and a means for recording the image;

said apparatus including a reference beam path means for guiding the reference beam so that a pulse of the reference beam arrives at the real time interferogram recording medium so as to be coincident with at least one of unscattered light and least scattered light from the object, thereby causing the interferogram recorded to represent the information content contained within the unscattered light or the least scattered light from the object (7).

2. Apparatus according to claim 1 wherein the recording means comprises an electronic camera (9) arranged to view the interferogram recording medium (8) and thus to electronically encode the image for recording in a memory device.

3. Apparatus according to claim 2 wherein the image is reconstructed the electronic camera (9) records the image, as it is recorded on the interferogram recording medium (8).

4. Apparatus according to claim 1 wherein the reference beam (4) impinges on the interferogram plane at a slanting angle so that the range and time of the image viewed correlate with position on the interferogram.

5. Apparatus according to claim 1 wherein means is provided to scan the recording medium (8) through the interferogram.

6. Apparatus according to claim 5 wherein said means comprises a carriage (11) whereby the recording medium is moved to scan through the interferogram.

7. Apparatus according to claim 6 further comprising a camera (9) which is moved synchronously with the recording medium (8) by the carriage (11).

8. Apparatus according to claim 6 further comprising a camera (9) which is held stationary, wherein the field of view of the camera (9) is scanned to by an optical assembly to keep the image in view.

9. Apparatus according to claim 5 wherein a reconstruction beam is scanned to follow the recording medium (8).

10. Apparatus according to claim 5 wherein the interferogram is scanned by optical means across the recording medium (8).

11. An apparatus for imaging an object obscured by a diffusing medium, comprising:

a pulsed laser light source to generate an object beam (3') and a reference beam (4') whereby the object (7) obscured by the diffusing medium can be illuminated with the object beam (3');

a real time interferogram recording medium (8), comprising a photorefractive medium, arranged to be exposed to, and to record an interferogram formed by the coincidence of light from the object (7) and the reference beam (4');

a means for reconstructing an image from the interferogram; and a means for recording the image;

wherein said apparatus includes a reference beam path means for guiding the reference beam so that a pulse of the reference beam arrives at the real time interferogram recording medium so as to be coincident with at lease one of unscattered light and least scattered light from the object, thereby causing the interferogram recorded to represent the information content contained within the unscattered light or the least scattered light from the object (7); and wherein the object and reference beams (3, 3'), (4, 4') impinge upon the recording medium (8) substantially parallel to each other and the reference beam (4, 4') passes through an adjustable delay line assembly (14) whereby the length of the path followed by the reference beam (4, 4') can be adjusted.

12. Apparatus according to claim 1 whereby a series of holographic images, each corresponding to a particular time-of-flight, or relative delay between the object and reference beams, can be combined to form a complex image of the object.

13. Apparatus according to claim 1 wherein a series of holographic images, each corresponding to a different time-of-flight, or relative delay between the object and reference beams, can be combined to form a 3-D image of the object.

14. Apparatus according to claim 1 whereby a series of holographic images, each corresponding to the same time-of-flight, or relative delay between the object and reference beams, can be combined to form a 2-D image of the object.

15. Apparatus according to claim 2 wherein a series of holographic images are stored and processed electronically.

16. Apparatus according to claim 15 wherein averaging of multiple holographic images is used to improve the quality of the reconstructed images.

17. Apparatus according to claim 16 wherein the averaging of multiple holographic images is used to improve the quality of the reconstructed images by reducing the deleterious effects of speckle.

18. Apparatus according to claim 17 wherein the averaging of multiple holographic images is used to improve the quality of the reconstructed images by reducing the deleterious effects of random or quasi-random processes occurring on time scales faster than the time between holographic exposures but slower than the recording time of the holographic exposure.

19. Apparatus according to claim 1 whereby a series of holographic images, each corresponding to a particular time-of-flight, or relative delay between the object and reference beams, can be viewed in real-time.

20. Apparatus according to claim 19 whereby a series of holographic images, each corresponding to a particular time-of-flight, or relative delay between the object and reference beams, can be viewed in real-time with the time-of-flight, or relative delay between the object and reference beams, being adjustable.

21. Apparatus according to claim 19 whereby the series of holographic images viewed in real-time benefit from the averaging or otherwise processing of multiple holographic exposures.

22. Apparatus according to claim 1 whereby a holographic exposure or series of holographic exposures, corresponding to a particular time-of-flight, or relative delay between the object and reference beams, is used to discriminate in favor of a particular temporal portion of an optical signal.

23. Apparatus according to claim 22 wherein the optical signal is one which carries information about the image of an object.

24. Apparatus according to claim 23 whereby the optical signal is one which originally carried information about the image of an object but which has propagated in or through an optically diffused medium and consequently some of the signal light has undergone scattering.

25. Apparatus according to claim 24 whereby a holographic exposure or series of holographic exposures, corresponding to a particular time-of-flight, or relative delay between the object and reference beams, is used to discriminate in favor of the temporal portion of the optical signal which carries the image information.

26. Apparatus according to claim 24 whereby a holographic exposure or series of holographic exposures, corresponding to a particular time-of-flight, or relative delay between the object and reference beams, is used to discriminate in favor of the early arriving temporal portion of the optical signal which corresponds to the unscattered part of the optical signal.

27. Apparatus according to claim 22 whereby the resulting holographic image or images benefit from the averaging or otherwise processing of multiple holographic exposures.

28. Apparatus according to claim 1 wherein a series of images are recorded, the images being of objects embedded in or located behind optically diffuse media.

29. Apparatus according to claim 27 whereby the optically diffuse media is animal or human body tissue or skin.

30. Apparatus according to claim 28 whereby the objects are tumours or other objects of interest to medical diagnosticians.

31. Apparatus according to claim 29 whereby the optically diffuse media is human body tissue or skin.

32. Apparatus according to claim 29 whereby the optically diffuse media is human breast tissue.

33. Apparatus according to claim 1 wherein a series of images are recorded and wherein the images are for the purpose of medical diagnosis or research.

34. A method of imaging an object obscured by a diffusing medium, the method comprising:

employing a pulsed laser light source to generate an object beam (3') and a reference beam (4') whereby the object (7) obscured by the diffusing medium can be illuminated with the object beam (3');

recording on a real time interferogram recording medium (8) comprising a photorefractive medium, an interferogram formed by the coincidence of light from the object (7) and the reference beam (4');

guiding the reference beam so that a pulse of the reference beam arrives at the real time interferogram recording medium so as to be coincident with at least one of unscattered light and least scattered light from the object, thereby causing the interferogram recorded to represent the information content contained within the unscattered light or the least scattered light from the object (7);

reconstructing an image from the interferogram; and recording the image.

* * * * *